Aug. 30, 1927.  
G. R. SIMPSON  
WEED PULLER  
Filed July 12, 1926
1,640,732
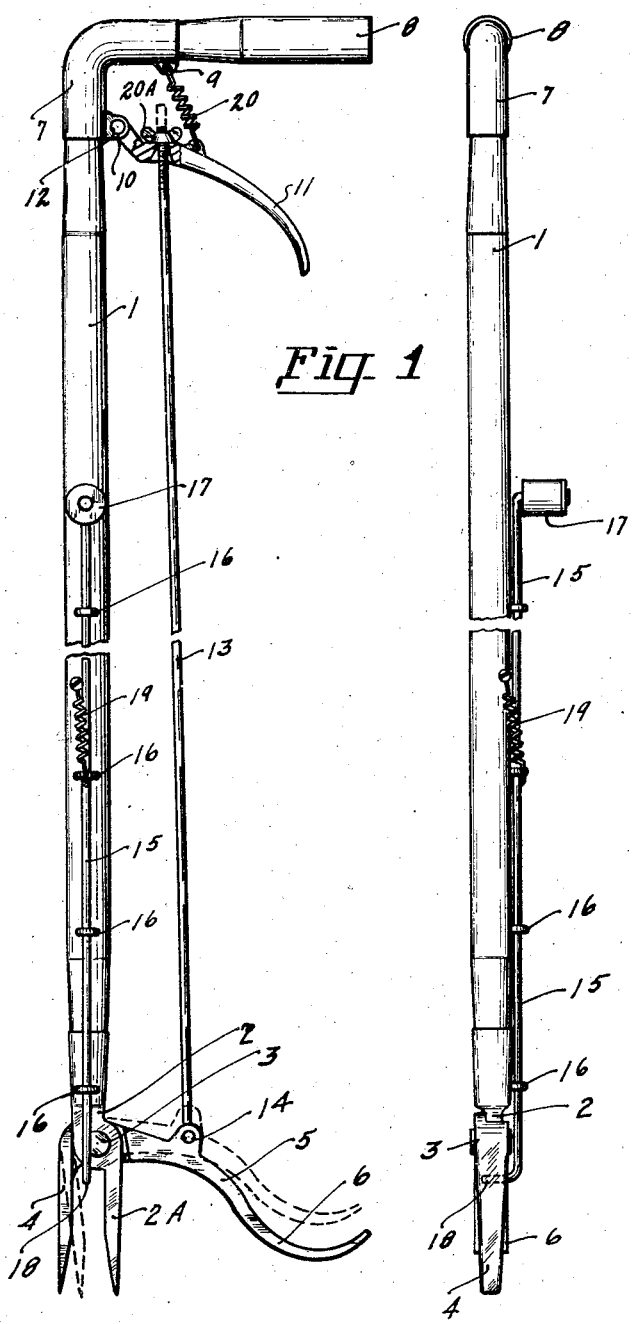
Inventor  
George R. Simpson  
Attorney Patented Aug. 30, 1927.

1,640,732

UNITED STATES PATENT OFFICE.

GEORGE R. SIMPSON, OF PORTLAND, OREGON.

WEED PULLER.

Application filed July 12, 1926. Serial No. 121,877.

My invention relates to improvements in weed pullers, provided with a vertical handle member which has disposed upon its lower end, jaw members. One of said jaw members is directly attached to the handle member and provided with a journal therein, upon which the other jaw member is journaled. The second jaw member has a fulcrum projecting therefrom and substantially at right angles thereto. This fulcrum is adapted to engagement with the ground for the purpose of creating a leverage when pulling weeds, or it may be used by the operator of my new and improved device as a foot rest to facilitate the entrance of the jaws into the ground and into intimate engagement and contact with the weed to be pulled.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification:—

In the drawings:—

Fig. 1 is a front elevation of the device completely assembled and shown ready for engagement with the weed to be pulled.

Fig. 2 is a side elevation, illustrating the mechanism shown in Fig. 1.

Like reference characters refer to like parts throughout the different views.

A journal 3 passes through the jawlike member and acts as a journal, about which the jaw 4 is made to partially rotate; each of the jaws 2ª and 4 are pointed at the lower end to facilitate the easy entrance of the same into the ground. The jaw 4 has a fulcrum arm 5, projecting from one side thereof and substantially at right angles to the jaw member 4 and is made circular on its outer end as shown at 6, to facilitate engagement with the ground when a lever action is formed thereabout to pull the weed; it is also made sufficiently long to facilitate the foot of the user therewith being placed thereupon to force the jaws into the ground. The cylindrical hand member 1, has secured to the upper end thereof, an elbow 7 and into the opposite end thereof; the hand engaging member 8, is secured and at substantially right angles to the handle member 1. Eyes 9 and 10 are formed upon the elbow 7 and lever 11 is secured to and is made to rotate about a pin 12. An adjustable tension rod 13 connects the lever 11 with an eye boss 14, disposed on the upper side of the lever 5. After the engagement of the jaws with the weed to be pulled, an upward movement of the lever 11 will cause the jaws 2ª and 4 to tightly engage with the weed to be pulled. The same may be pulled by using the lever 5 as a fulcrum and contacting the same with the surface of the ground, thus creating a mechanical advantage for the pulling of the weed if the same is of substantial size and magnitude, because of the mechanical advantage provided, many times the root of the weed is sufficiently flattened that a number of weeds may be pulled with the pulling device before freeing the puller of the pulled weeds and to facilitate the removal of the same I have provided a removing rod 15, running parallel with the handle member 1, of the device, the same being held in position by passing through the eyes 16, secured to the handle member. A hand engaging member 17, is provided on the upper end thereof to facilitate its movement and is bent at right angles at the lower end as illustrated at 18, and passes through and between the jawlike members 2ª and 4 of the device, so that when one or more weeds are in position within the jaws, the same may be placed over the receptacle for the weeds to be placed therein and a downward movement imparted to the rod 15, thus passing the foot 18 thereof, between the jaws and freeing the same of weeds being maintained therebetween. A spring 19 normally maintains the foot 18 of the rod 15 in raised position. A spring 20 normally maintains the lever 11 in raised position and the jaws 2ª and 4 of the device in intimate contact with each other. By placing an adjusting nut 20ᴬ upon the threaded end of the rod 13, the amount of opening of the jaws may be regulated and the depth of the penetration of the jaws may be regulated also. It will thus be seen that I have created a simple and efficient device adapted for the purposes intended and one that may be easily operated and wherein the largest weeds may be pulled without the exertion of more than ordinary energy on the part of the operator thereof.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:—

1. In combination in a new and improved weed puller of a cylindrical handle member terminating on its lower end in a metallic jaw, said jaw carrying a pivotal pin, and terminating on its upper end with an elbow, and a horizontal hand engaging member secured to the oppositely disposed end of the elbow, a second jaw in engaging relationship with the first and journaled about the journal pin, and a foot lever formed on one side of the second jaw and at substantially right angles thereto and a weed disengaging member maintained in slidable relationship with the main handle and having a foot formed upon the lower end thereof, and spring means adapted to maintain the said member in normally raised position.

2. In a weed puller, comprising a handle member, a pointed jaw carrying a pivotal pin secured to one end of the handle member, a second pointed jaw in working relationship with the first and having a lever formed at substantially right angles thereto, an elbow secured to the opposite end of the handle member and having disposed thereto a hand engaging member, a hand lever pivotally connected to the elbow and an adjustable tension rod connecting the hand lever and the arm disposed at substantially right angles to the second jaw, spring means for normally holding the jaws in intimate contact with each other and a weed disengaging rod in slidable relation with the handle member and having a foot formed thereon and normally maintained between the engaging jaws and a spring adapted to maintain the weed disengaging member in normally raised position.

GEORGE R. SIMPSON.